Oct. 5, 1965     T. L. SMITH ETAL     3,209,427
PIPE CLAMP
Filed July 30, 1962
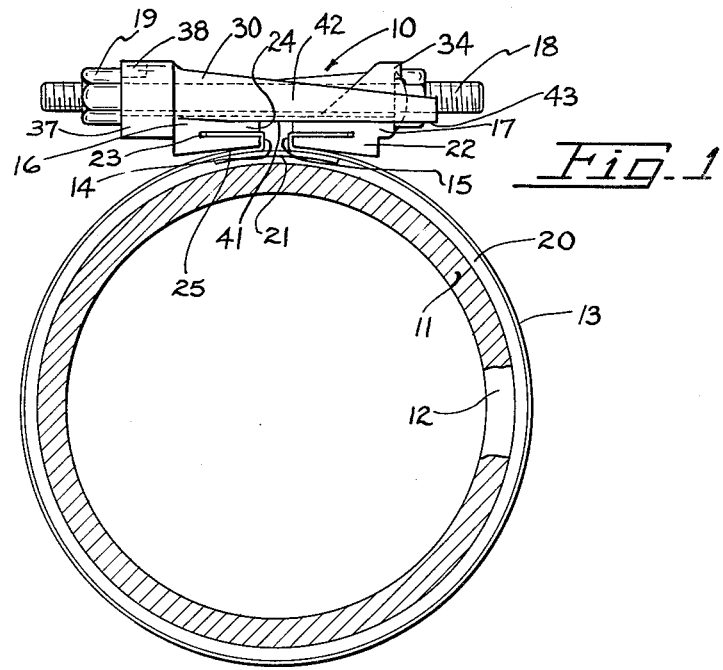
Fig. 1
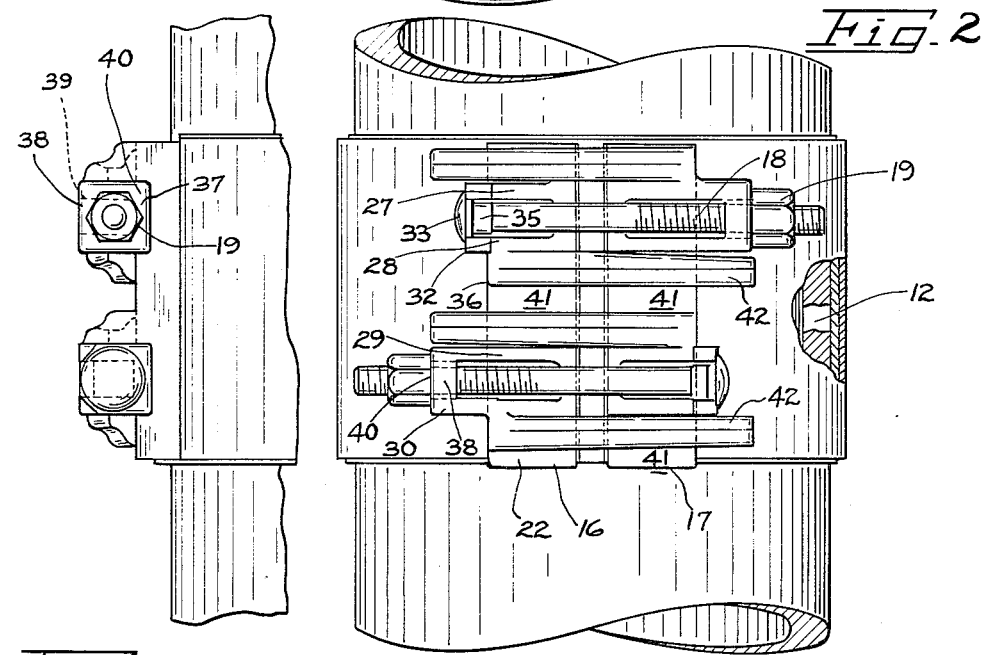
Fig. 2
Fig. 3
INVENTORS
TELFORD L. SMITH
THOMAS A. GRAHAM
BY
ATTORNEY

United States Patent Office 3,209,427
Patented Oct. 5, 1965

3,209,427
PIPE CLAMP
Telford L. Smith, Watsonville, and Thomas A. Graham, San Carlos, Calif., assignors to Smith-Blair, Inc., South San Francisco, Calif., a corporation of California
Filed July 30, 1962, Ser. No. 213,479
3 Claims. (Cl. 24—279)

This invention relates to pipe clamps and pipe couplings of the type in which rigid lugs are used to secure together the ends of a flexible band that goes around the pipe. More particularly it relates to an improved structure of mating lugs for such a pipe clamp.

In pipe clamps of the malleable band type there was for a long time a serious problem of stabilizing the rigid clamp lugs during the tightening of the flexible band around the pipe. What happened was that the lugs rocked toward each other and caused the bolts to bend, thus making it impossible to obtain the maximum clamping pressure. This fundamental problem was overcome to a large degree by the use of rigid lugs having projecting fingers extending from each of the lugs and bearing on the opposite ones, thereby preventing both lugs from tilting. Such a lug configuration is shown in application Serial No. 806,869 filed April 16, 1959, and now Patent No. 3,089,212. The present invention is concerned with the problem of providing an increased range of adjustability for clamps having the aforementioned finger type lugs.

Malleable band type pipe clamps are generally used for water conduit system composed of asbestos cement pipe. It is characteristic of this pipe material, and in fact other well known pipe materials that the actual outside circumferential dimension often varies over a considerable range from the specified nominal size. In order to compensate for these large dimensional variations in standard pipe members, it is necessary that the pipe clamps used have a considerable range of adjustability so that in every case the lugs can be drawn together to tighten the band without causing the lugs to rock towards each other. Heretofore, the necessary range of adjustability was provided in most pipe clamps including those with fingers by forming the clamp as a two piece unit with two semi-circular band pieces held together by two sets of lugs. Although this arrangement doubled the range of adjustability normally available in a single pair of lugs, it was a costly expedient, and the range of adjustability attained was still quite limited. Also, such clamps were often extremely difficult to install due to the necessity of locating one of the sets of lugs on a blind side of the pipe.

It is therefore one general object of the present invention to provide a pipe clamp having lugs with stabilizing fingers and yet with a wide range of adjustability wherein the clamp can be fully tightened so that with a full cylindrical band and only one set of lugs it can accommodate a wide range of pipe sizes.

Basically, the increased range of adjustability of the pipe clamp according to the present invention is achieved by increasing the length of each of the projecting fingers of the mating clamp lugs so that the fingers will form their stabilizing function when the lugs are either close together or are relatively far apart. However, the lengthening of the stabilizing fingers created an additional problem in that when the lugs were drawn close together the length of the fingers extended closely adjacent to the nuts on the bolts and made it impossible to tighten the nuts when the lugs were taken up to their final position.

Accordingly, it is another object of the invention to provide a pipe clamp having projecting fingers of extended length to increase the adjustability range of the clamp lugs, and which will not interfere with the tightening of the clamp even when it is necessary to bring the lugs close together.

An important aspect of the present invention is that it solves the problem of providing an increased adjustability range without sacrificing the important basic design features of having the finger bearing surfaces in a plane generally coincident with or below the bolt axes and of having the bolts located near the surface of the pipe. It is known that both of these factors are important in keeping the tilting forces on the lugs and the bending forces on the bolts to a minimum, thus enabling the flexible band to apply a maximum pressure to the gasket.

Other objects, advantages and features of the invention will become apparent from the following detailed description of a preferred embodiment presented with the drawings, in which:

FIG. 1 is a view in end elevation showing a pipe clamp embodying the principles of the invention in its installed position around the pipe;

FIG. 2 is a top plan view of the pipe clamp shown in FIG. 1 with a portion of the clamp broken away to show the location of the break in the pipe;

FIG. 3 is a fragmentary view in side elevation of the pipe clamp of FIGS. 1 and 2.

In FIGS. 1 through 3 is shown a pipe clamp 10 embodying the principles of the present invention as it appears when tightened around a section of pipe 11 having a crack or hole indicated by the numeral 12. Generally, the clamp 10 comprises a malleable band 13 whose ends 14 and 15 are preferably bent over for installation in two lugs 16 and 17. The lugs are preferably a matching pair and it is their unique configuration that enables them to provide a wide range of adjustability and eliminates the need for a two-piece band and two sets of lugs. The lugs are tightened together by bolts 18 and nuts 19 which serve to pull the one-piece band 13 around a gasket 20 or directly around the pipe 11, if desired. A gasket 20 is most generally used and preferably it is provided with an armoring strip 21 adjacent the bite of the lugs 16 and 17, thus providing a rigid surface on which the lugs can bear to maintain adequate sealing pressure on the gasket 20 between the lugs. In the present invention the armoring strip 21 preferably has a greater width and a slightly heavier gauge than the armoring strips heretofore used on the two-piece band type of clamp, in order for it to accommodate the increased range of adjustability afforded by the lugs 16 and 17.

As with previous finger type clamps the lugs 16 and 17 are preferably cast from some ductile material such as bronze or malleable iron. As shown in FIG. 1, each lug has a somewhat wedge-shaped base portion 22 which when attached to the band 13 extends generally axially along the pipe 11. The base 22 of each mating lug 16 and 17 is provided with a slot 23 forming a pair of jaws 24 and 25 into which the ends 14 and 15 of the malleable clamping band 13 are secured. The jaws 24 and 25 are originally cast in the open position and one is provided with projections that lie opposite mating holes or recesses in the other jaw. The band 13 is either perforated with matching holes or the closing together of the jaws 24 and 25 upsets portions, so that in either case the jaws clinch the ends of the band 13 and hold them in place when forced together. Other means may be used to attach the ends of the band 13 to the lugs, but the aforementioned method is preferred and is described in greater detail in the aforesaid copending application Serial No. 806,869.

As shown in FIG. 2, adjacent bolts 18 extend in opposite directions across the mating lugs 16 and 17. On the base portion 22 each of the lugs are attached a series or radially outwardly extending projections for holding the bolts 18 in position to accomplish the tightening of the clamp. These projections are arranged in pairs and are designated by the numeral 27, 28 and 29, 30. On both of the lugs 16 and 17 the projections 27, 28 define between them a bolt receiving channel or slot 31. The faces 32 of the channel defining members 27 and 28 on which the head 33 of a bolt bears have outwardly extending ears 34 to hold the bolt in place. The bolt fits with its head 33 bearing against the faces 32 and with its square shank portion 35 fitting fairly snugly in the slot 31.

The projections 29 and 30 adapted to retain the nut end of the bolt are also spaced apart on both of the lugs 16 and 17. In accordance with the present invention the projections 29 and 30 are extended for a substantially greater length beyond the rear edge 36 of each base portion 22. At their lower edges they are connected together by an extended lug portion 37 and along their upper edges by a bridged over portion 38.

Thus at their outer end, the extended and bridged projections 29 and 30 provide an opening 39 in which the bolt 18 is secured prior to assembly of the clamp 10 on a pipe. The end of this slotted opening 39 has a flat face 40 against which the nut 19 or a washer will bear when the nut is screwed down to tighten the clamp. On each of the lugs 16 and 17 separate pairs of projections 27, 28 and 29, 30 are spaced apart alternately along the base portions 22 of each of the lugs 16 and 17 so that in each pair of mating lugs all of the bridged over projections 29 and 30 on one lug are aligned with the slotted projections 27 and 28 on the opposite mating lug.

In the drawings, the clamp 10 is shown having the lugs 16 and 17 each with only two pairs of projections 27, 28 and 29, 30. However, it is obvious that clamps of greater axial length having any desired number of pairs of projections may be constructed within the scope of the invention. The pairs of projections 27, 28 and 29, 30 are spaced apart at intervals along the lugs 16 and 17 and from the end of the lugs so that adjacent each pair of projections, and more specifically, the projections 27 and 29, the upper side of the wedge-shaped lug body portion 22 forms a bearing surface 41.

Secured to each of the lugs 16 and 17 and extending tangentially from the projections 28 and 30 are a plurality of stabilizing arms or fingers 42. All of the fingers 42 and 43 have substantially the same length but they are generally longer than the fingers heretofore used on pipe clamps in accordance with the present invention. The increased length between the fingers 42 and those of prior art finger type clamps represents approximately the increased amount of adjustability that our pipe clamp affords, but of course the invention is not limited to any specific dimensional relationship.

The guide fingers 42 project in the same general plane as the bolts 18 and each has a lower surface 43. These surfaces are substantially coplanar with and are adapted to engage the smooth planar bearing surfaces 42 on mating lugs. Each relatively long finger 42 is secured to a lug and extends from a projection 30 of the bridged over bolt retaining means, or from the projections 28 on each lug which retain the head ends of the bolts. As shown in FIG. 2, when the clamp 10 is assembled with the bolts 18 arranged in alternate directions along the lugs 16 and 17 each bolt 18 is retained at its head end 33 within a slot 31 formed by the projections 27, 28 and at its other end by a nut 19 bearing against the surface 40 on the extended bridged over projections 29 and 30. Thus, in accordance with the invention, the long fingers 42 provide an increased range of adjustability for our clamp 10 because even when the lugs 16 and 17 are caused to be spaced relatively far apart the fingers 42 will extend far enough to bear on the opposite lug to prevent bolt bending. Yet, in cases where the lugs must be drawn closely together to tighten them the long fingers 42 can never interfere with the tightening of the nuts 19 on the bolts 18 because of the extended bridged over projections 29 and 30. This important feature of our invention is clearly illustrated in the drawing which in FIGS. 1 and 2 shows the lugs drawn up closely together as they would be for an undersized pipe.

The installation of the clamp 10 is simple. The ends 14, 15 of the band 13 are fitted into their respective lugs 16 and 17 and retained by the malleable jaws 24 and 25 of the lugs in the manner previously described. With lugs 16 and 17 thus attached, the malleable band 13 is placed around the pipe 11 at the break 12 with the gasket 20 between the pipe and band, and its armoring strip 21 between the lugs 16 and 17. The bolts 18 are first attached loosely to each lug, each bolt 18 being retained by a nut 19 at its threaded end in an opening 39 formed by a pair of extended bridged over projections 29 and 30. The lugs 16 and 17 are now brought together and the heads 33 of the bolts 18 can be dropped into the slots 31 formed by the projections 27 and 28 on each of the lugs where they are retained by the ears 34. As the nuts 19 are taken up to bring the lugs together, the relatively long stabilizing fingers 42 engage the bearing surfaces 41 adjacent the projections on opposite lugs.

From the foregoing description it should be apparent that our improved clamp structure provides a range of adjustability in pipe clamps which has been greatly increased to the point where the need for a second pair of lugs in a two-piece clamp has been eliminated. Yet, by virtue of our novel lug configuration the extra length on the fingers used in obtaining this important advantage in no way interferes with the tightening of the clamp no matter how close together the lugs are drawn.

To those skilled in the art to which this invention relates, many changes in the construction and widely differing embodiments and applications of the invention will suggest themselves without departing from the spirit and scope of the invention. The disclosures and the description herein are purely illustrative and are not intended to be in any sense limiting.

We claim:

1. In a pipe clamp of the type having a malleable band with ends secured in a pair of lugs adapted to be tightened together by bolts and nuts at least one of said pair of lugs comprising:

a wedge-shaped base portion with a radially outer surface;

at least one pair of tangentially projecting fingers extending from each of said lugs, each of said fingers having a radially inner surface adapted to engage the radially outer surface of the base portion of the other said lug;

a plurality of bolt receiving projections extending radially outwardly from said outer surface on each of said lugs for retaining a plurality of bolts, said projections being arranged in pairs, half of said pairs forming open slot means for retaining the head end of a said bolt, and the other half of said pairs of projections having a bridged over portion forming a partially covered slot means and a bearing surface for retaining nuts on said bolts, said bridged over pairs of projections extending outwardly at a substantially greater distance away from the outer edge of said lug base portion than the adjacent pair of said projections forming the open slot means, the ends of said fingers being in a plane containing said bearing surface when the nuts are tightened;

whereby said fingers do not interfere with the tightening of said nuts when said lugs are drawn closely together.

2. In a pipe clamp of the type having a malleable band with ends secured in a pair of lugs adapted to be tightened together by bolts and nuts at least one of said pair of lugs comprising:

a wedge-shaped base portion with a radially outer surface;

at least one pair of tangentially projecting fingers extending from each of said lugs, each of said fingers having a radially inner surface adapted to engage the radially outer surface of the base portion of the other said lug;

a plurality of bolt receiving projections extending radially outwardly from said outer surface on each of said lugs for retaining a plurality of bolts extending between said lugs in an alternating end to end arrangement, said projections being arranged in spaced apart alternating pairs, half of said pairs forming open slot means for retaining the head end of a said bolt, and the other half of said pairs of projections each having a bridged over portion forming a partially covered slot means and a bearing surface for retaining a nut for a said bolt, said bridged over pairs of projections extending outwardly substantially farther away from the outer edge of said lug base portion than said pair of projections forming the open slot means, the ends of said fingers being in a plane containing said bearing surfaces when the nuts are tightened;

whereby said fingers do not interfere with the tightening of said nuts when said lugs are drawn closely together.

3. In a pipe clamp of the type having a malleable band with ends secured in a pair of lugs adapted to be tightened together by bolts and nuts, each of said pair of lugs comprising:

a base portion having a wedge-shaped cross section with a radially outer surface;

at least one pair of tangentially projecting fingers extending from each of said lugs, each of said fingers having a radially inner surface adapted to engage the radially outer surface of the base portion of the other said lug;

a plurality of bolt receiving projections extending radially outwardly from said outer surface on each of said lugs for retaining a plurality of bolts, said projections being arranged in alternating pairs on said base portion, half of said pairs of projections forming open slot means for retaining the head end of a said bolt, and the other half of said pairs of projections having a bridged over portion forming a partially covered slot means and a bearing surface for retaining a nut for a said bolt, each said bridged over pair of projections being aligned with a pair of slot forming projections on the opposite lug and having an integral portion extending outwardly and rearwardly at a substantially greater distance away from the rear outer edge of its said lug base portion than the adjacent pair of projections forming the open slot means; the ends of said fingers being in a plane containing said bearing surface when the nuts are tightened;

whereby said fingers do not interfere with the tightening of said nuts when said lugs are drawn closely together.

References Cited by the Examiner
UNITED STATES PATENTS

| | | | |
|---|---|---|---|
| 1,937,881 | 12/33 | Fisher | 285—367 X |
| 1,948,274 | 2/34 | McMurray | 285—373 |
| 2,816,343 | 12/57 | Decker | 24—279 |
| 2,897,568 | 8/59 | Hoke | 24—279 |
| 2,936,186 | 5/60 | Dunmire | 24—279 X |
| 2,977,995 | 4/61 | Walpole | 24—279 X |
| 2,998,629 | 9/61 | Smith | 24—279 |
| 3,088,185 | 5/63 | Smith | 24—279 |
| 3,089,212 | 5/63 | Graham et al. | 24—279 |

DONLEY J. STOCKING, *Primary Examiner.*

ABRAHAM G. STONE, *Examiner.*